(12) United States Patent
Sakakibara et al.

(10) Patent No.: US 9,499,243 B2
(45) Date of Patent: Nov. 22, 2016

(54) VERTICAL PNEUMATIC FENDER

(71) Applicant: The Yokohama Rubber Co., LTD., Minato-ku, Tokyo (JP)

(72) Inventors: Shigeki Sakakibara, Hiratsuka (JP); Minami Izumi, Hiratsuka (JP); Shu Yamada, Hiratsuka (JP); Akihiro Iemoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/890,249

(22) PCT Filed: Apr. 7, 2014

(86) PCT No.: PCT/JP2014/060096
§ 371 (c)(1),
(2) Date: Nov. 10, 2015

(87) PCT Pub. No.: WO2014/181623
PCT Pub. Date: Nov. 13, 2014

(65) Prior Publication Data
US 2016/0083056 A1    Mar. 24, 2016

(30) Foreign Application Priority Data

May 10, 2013    (JP) ................. 2013-100244

(51) Int. Cl.
*B63B 59/02*    (2006.01)
*E02B 3/26*    (2006.01)
*E02B 17/00*    (2006.01)

(52) U.S. Cl.
CPC ............ *B63B 59/02* (2013.01); *E02B 3/26* (2013.01); *E02B 17/003* (2013.01); *B63B 2059/025* (2013.01)

(58) Field of Classification Search
CPC .. B63B 2059/025; E02B 17/003; E02B 3/26
See application file for complete search history.

(56) References Cited

U.S. PATENT DOCUMENTS 3,276,414 A * 10/1966 Lee ........................... E02B 3/26
114/219
4,296,705 A    10/1981 Uruta et al.

FOREIGN PATENT DOCUMENTS

| JP | S54-0118098 | 9/1979 |
| JP | H11-0117261 | 4/1999 |
| JP | 2003-090025 | 3/2003 |
| JP | 2006-316511 | 11/2006 |

OTHER PUBLICATIONS

International Search Report for International Application No. PCT/JP2014/060096 dated Jul. 1, 2014, 2 pages, Japan.

* cited by examiner

*Primary Examiner* — Edwin Swinehart
(74) *Attorney, Agent, or Firm* — Thorpe North & Western

(57) ABSTRACT

A vertical pneumatic fender includes a bob connected to a lower hemispherical portion, an internal space containing a predetermined amount of ballast water, a body portion constituted by reinforcing layers layered between an inner rubber layer and an outer rubber layer, cords of adjacently layered upper and lower reinforcing layers disposed intersecting each other at a predetermined cord angle with respect to a cylinder axial direction, and intermediate rubber layers interposed between the reinforcing layers, where the cord angle in a neutral state is set to at least 15° and no more than 45°.

8 Claims, 5 Drawing Sheets

VERTICAL PNEUMATIC FENDER

TECHNICAL FIELD

The present technology relates to a vertical pneumatic fender, and more specifically to a vertical pneumatic fender that is capable of responding to sudden increases in berthing impact energy.

BACKGROUND

One type of pneumatic fender is a vertical pneumatic fender comprising a bob connected to a lower hemispherical portion and containing a predetermined amount of ballast water in an internal space (see, for example, Japanese Unexamined Patent Application Publication No. H11-117261A). The stability of the position of the vertical pneumatic fender is maintained by balancing the vertical downward force of the bob and the ballast water in the internal space and the buoyancy of the fender.

Pneumatic fenders normally have a cylindrical-shaped body portion with bowl-shaped mirror-sections provided at both ends, and the body portion has a layered configuration with a plurality of reinforcing layers between inner rubber layer and outer rubber layer. The reinforcing layers are cord layers formed by arranging a plurality of cords in parallel, and the cords are disposed at a predetermined cord angle with respect to the axial direction of the cylinder. The cords of adjacently layered upper and lower reinforcing layers are disposed so as to intersect one another. Conventionally, the cord angle is set to roughly an angle of repose (54° to 55°) in a neutral state, with the result that there is relatively little change in the size (i.e., length and outer diameter) of the body portion even when the interior of the pneumatic fender is inflated to specified internal pressure.

When a moored vessel suddenly rocks due to a tsunami or the like, causing the fender to be excessively compressed by greater than expected berthing impact energy, a safety valve opens, venting air within the internal space to the outside. If the safety valve remains open during this process, an excessive amount of air may be vented to the outside, causing the fender to sink due to insufficient buoyancy in the worst-case scenario. Conversely, if the fender is compressed too rapidly compared to the speed at which air is vented to the outside, the internal pressure of the fender will suddenly increase, potentially causing the fender to burst in the worst-case scenario. There is therefore a demand for a vertical pneumatic fender that is capable of responding to sudden increases in berthing impact energy.

SUMMARY

The present technology provides a vertical pneumatic fender that is capable of responding to sudden increases in berthing impact energy.

A vertical pneumatic fender according to the present technology is a vertical pneumatic fender provided with hemispherical portions at both ends of a cylindrical body portion, the body portion being constituted by a plurality of reinforcing layers layered between an inner rubber layer and an outer rubber layer, the reinforcing layers being cord layers formed from a multiplicity of cords arranged in parallel, cords in adjacently layered upper and lower reinforcing layers being disposed so as to intersect one another at a predetermined cord angle with respect to the cylinder axial direction, a bob being connected to the lower hemispherical portion, and ballast water being contained within an internal space of the fender, wherein the fender is characterized in that intermediate rubber layers are interposed between the reinforcing layers, the cord angle is set to from 15° to 45° both inclusive in a neutral state, and an air injection device for injecting additional air is connected to the internal space.

In accordance with the present technology, intermediate rubber layers in an unexpanded neutral state are interposed between the reinforcing layers, and the cords of adjacently layered upper and lower reinforcing layers are disposed intersecting each other at cord angles of from 15° to 45° both inclusive with respect to the cylinder axial direction; thus, when additional air is injected into the fender in a neutral state via the air injection device, the cord angles increase to a stable angle of repose. In this case, each of the intermediate rubber layers deforms in shear, with the result that the cord angle increases smoothly up to roughly the angle of repose. As a result, the body portion expands in diameter and the internal space rapidly increases in volume, yielding a rapid and dramatic improvement in energy-absorbing capability.

In addition, internal pressure increases due to the injection of additional air into the internal space, which also increases energy-absorbing capability. Thus, even if a moored vessel suddenly rocks to a tsunami or the like, causing a sudden increase in berthing impact energy, the fender is capable of sufficiently responding thereto without bursting.

The air injection device can be, for example, a built-in power source operated or non-electrically operated air injection cylinder. An air injection cylinder of this sort enables rapid injection of air into the internal space of the fender without the need for an external power source, reliably allowing for dramatic improvement in the energy absorption of the fender even during power outages and other emergency situations.

The thickness of the intermediate rubber layer in a neutral state is, for example, from 1 mm to 5 mm both inclusive. An intermediate rubber layer thickness of less than 1 mm thick will impede the smooth increase of the cord angle to roughly the angle of repose, and thus making it difficult for the body portion to increase in diameter. Meanwhile, an intermediate rubber layer thickness in excess of 5 mm will cause the fender to be excessively heavy.

A 100% modulus of from 0.5 MPa to 5.0 MPa both inclusive for the rubber forming the intermediate rubber layer will allow for the stable expansion of the body portion to a sufficient diameter. If the 100% modulus of the rubber forming the intermediate rubber layer is less than 0.5 MPa, the body portion will take time to contract and reduce in diameter, and may not return to its original diameter. Conversely, if the 100% modulus exceeds 5.0 MPa, the shear force of the intermediate rubber layer during expansion will increase, impeding deformation and making it difficult for the body portion to sufficiently increase in diameter.

An arrangement in which the thickness of the intermediate rubber layer in a neutral state increases the closer the intermediate rubber layer is to the outer circumferential side of the fender is also possible. When the body portion increases in diameter, higher levels of shear deformation may be necessary the closer the intermediate rubber layer is to the exterior; thus, such an arrangement is advantageous in keeping an excessive load from being placed upon some of the intermediate rubber layers.

BRIEF DESCRIPTION OF THE DRAWING(S)

DETAILED DESCRIPTION

Figure 1:
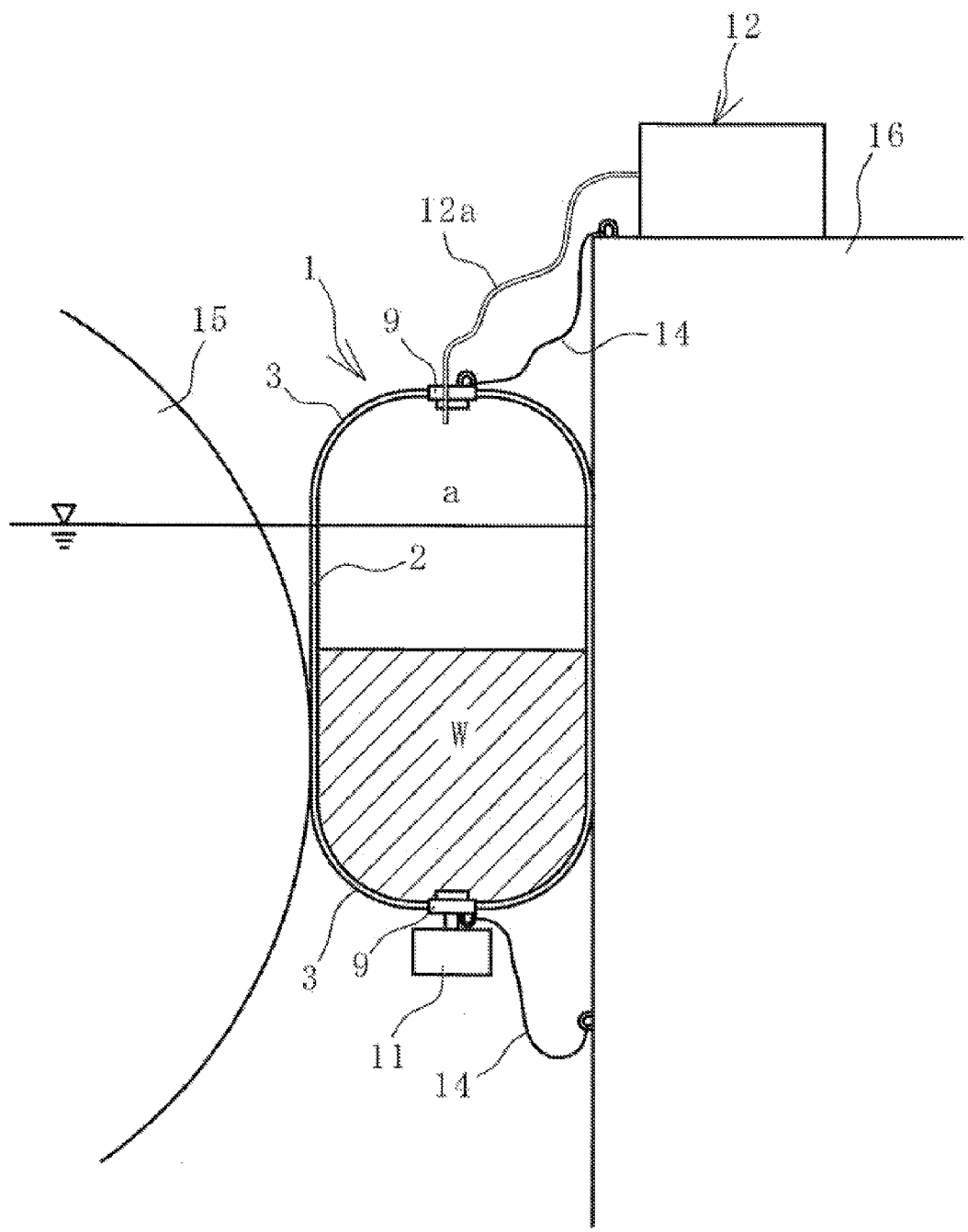
FIG. 1 is an explanatory drawing illustrating a vertical pneumatic fender according to the present technology in use.

The vertical pneumatic fender according to the present technology will now be described on the basis of the embodiments illustrated in the drawings.

Figure 2:
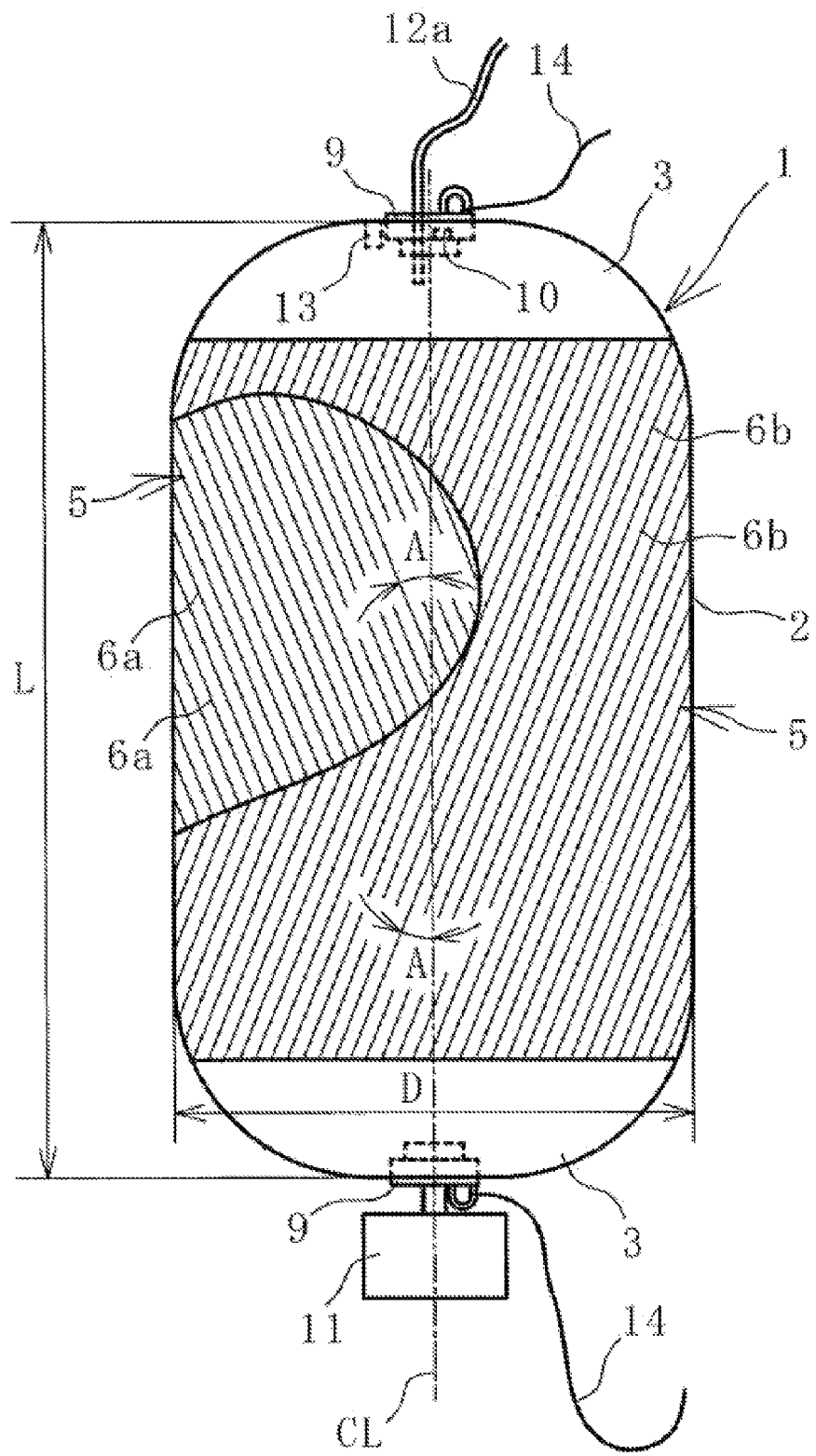
FIG. 2 is a partially cut-out explanatory drawing illustrating the state of reinforcing layers in a body portion of the vertical pneumatic fender illustrated in FIG. 1 in a neutral state.
Figure 3:
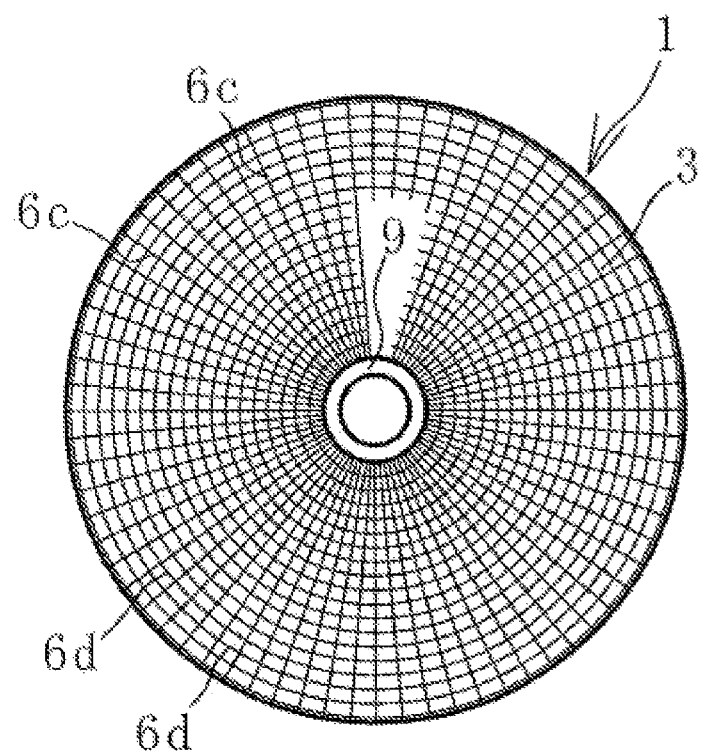
FIG. 3 is an explanatory drawing illustrating the state of reinforcing layers in a hemispherical portion illustrated in FIG. 2.

As illustrated in FIGS. 1 to 3, a vertical pneumatic fender 1 (hereinafter, referred to as fender 1) according to the present technology comprises a cylindrical body portion 2 and bowl-shaped hemispherical portions 3 at both ends thereof. Each of the hemispherical portions 3 is provided with a fitting 9. An internal space of the fender 1 contains a predetermined amount of ballast water W.

A safety valve 10 is provided in the fitting 9 of the upper hemispherical portion 3, and a pressure sensor 13 is provided in or near the fitting 9. The safety valve 10 opens when the internal pressure of the fender 1 exceeds a preset maximum pressure, venting air a within the internal space to the exterior and reducing the internal pressure. The pressure sensor 13 detects the internal pressure of the fender 1.

An injection tube 12a of an air injection device 12 is further connected to the fitting 9 of the upper hemispherical portion 3. The injection tube 12a is a pipe, hose, or equivalent member; ordinarily, the air injection device 12 is inactive, and the injection tube 12a is closed. When necessary, the air injection device 12 injects additional air a into the internal space of the fender 1. The air injection device 12 can be, for example, a built-in power source operated or non-electrically operated air injection cylinder.

A bob 11 is connected to the fitting 9 of the lower hemispherical portion 3. One end of a guy chain 14 is connected to each of the fittings 9. The other ends of the guy chains 14 are fastened to a quay 16 by anchors or the like.

The ballast water W and the bob 11 apply a vertical downward force to the fender 1, and the balance between this vertical downward force and the buoyancy of the fender 1 keeps the fender 1 in an upright position with the hemispherical portions 3 on both ends disposed above and below.

Figure 4:
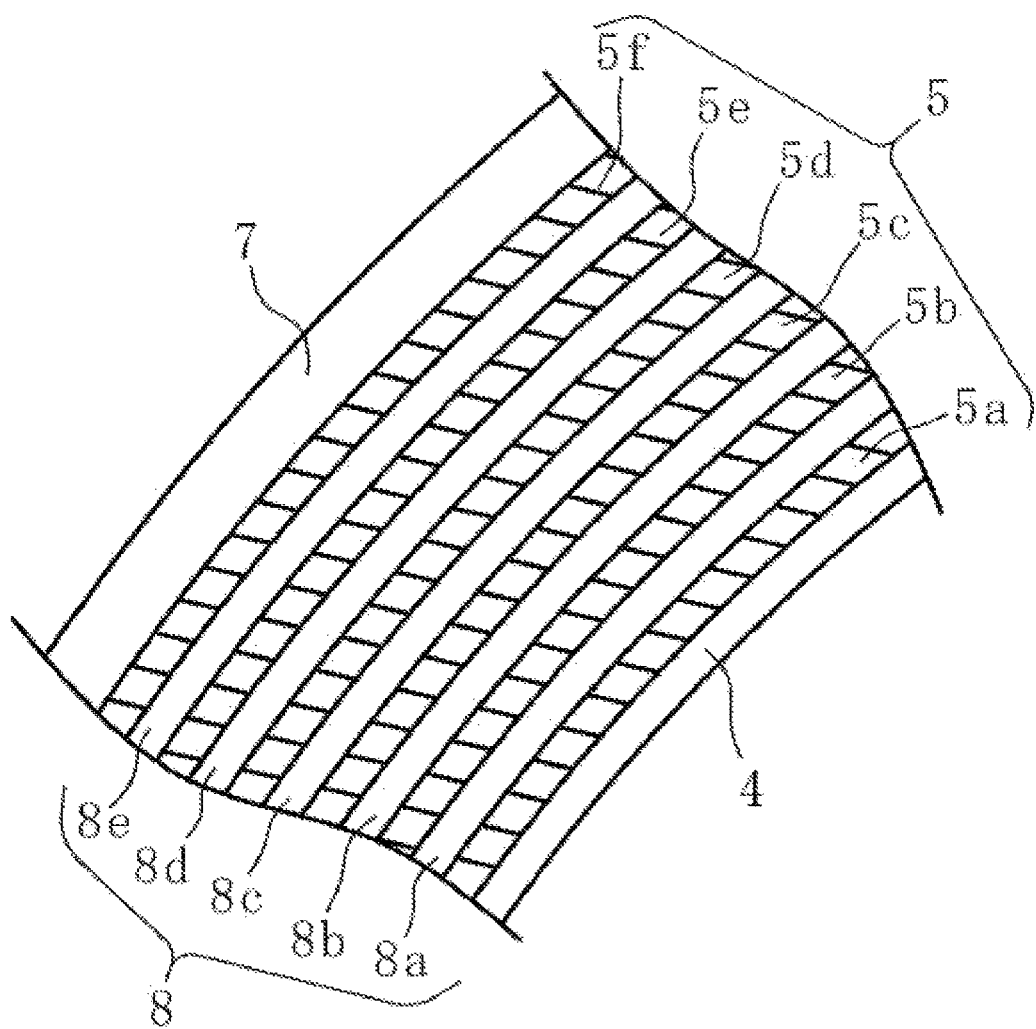
FIG. 4 is a partially magnified cross-sectional view of the body portion of the vertical pneumatic fender illustrated in FIG. 2.

As illustrated in FIG. 4, the body portion 2 is constituted by a plurality of reinforcing layers 5 layered between an inner rubber layer 4 and an outer rubber layer 7. In this embodiment, six reinforcing layers 5 (5a to 5f) are layered. The number of layers of reinforcing layers 5 is, for example, roughly from 6 to 12. An intermediate rubber layer 8 (8a to 8e) is disposed between each of the reinforcing layers 5.

Each of the reinforcing layers 5 is a cord layer formed from a plurality of cords 6a (6b) arranged in parallel. The cords 6a, 6b of adjacent layered reinforcing layers 5 intersect, and are disposed with a predetermined cord angle A with respect to the cylinder axial direction (cylinder center line CL) of the body portion 2. In other words, the reinforcing layer 5a of the inner peripheral side first layer, the reinforcing layer 5c of the third layer, and the reinforcing layer 5e of the fifth layer have a cord angle A in the same direction. The reinforcing layer 5b of the inner peripheral side second layer, the reinforcing layer 5d of the fourth layer, and the reinforcing layer 5f of the sixth layer have a cord angle A in the same direction, and, this cord angle A has the opposite orientation to that of the reinforcing layers 5a, 5c, 5e.

Steel cords or organic fiber cords or the like can be used as the cords 6a, 6b. The outer diameter of the cords 6a, 6b is, for example, roughly from 0.5 mm to 1.5 mm both inclusive.

The hemispherical portions 3 have a layered configuration with a plurality of reinforcing layers between the inner rubber layer 4 and the outer rubber layer 7. A reinforcing layer (cord layer) formed from cords 6c disposed in a radial manner, and a reinforcing layer (cord layer) formed from cords 6d disposed in the circumferential direction are alternately layered. The specification of the cords 6c, 6d is basically the same as that of the cords 6a, 6b of the reinforcing layers 5 of the body portion 2.

In a neutral state, the thickness of the intermediate rubber layers 8 of the fender 1 of the present technology is from 1 mm to 5 mm both inclusive, and the cord angle A is from 15° to 45° both inclusive. A "neutral state" is one in which the internal space of the fender 1 is at the specified internal pressure for ordinary use. Specified internal pressure is, for example, roughly from 50 kPa to 100 kPa both inclusive.

In a conventional pneumatic fender, only very thin adhesive rubber is disposed between two reinforcing layers that are adjacent to each other in the radial direction in order to bond them together. In the present technology, as illustrated in FIG. 4, the intermediate rubber layers 8 are also deliberately interposed along with the adhesive rubber. For example, natural rubber, butyl rubber, styrene butadiene rubber, acrylonitrile butadiene rubber, or the like are used as the rubber forming the intermediate rubber layer 8.

For example natural rubber, butyl rubber, styrene butadiene rubber, acrylonitrile butadiene rubber, or the like are used as the rubber forming the inner rubber layer 4. For example natural rubber, styrene butadiene rubber, acrylonitrile butadiene rubber, ethylene propylene rubber, or the like are used as the rubber forming the outer rubber layer 7. When the fender 1 is in a neutral state, the thickness of the inner rubber layer 4 is, for example, roughly from 2 mm to 5 mm both inclusive, and the thickness of the outer rubber layer 7 is, for example, roughly from 3 mm to 12 mm both inclusive.

When the fender 1 is mounted at an installation location for actual use, ballast water W and air a are injected through the valve installed in the fitting 9 into the internal space. When air a has been injected until specified internal pressure is reached and the fender 1 is in a neutral state, the cord angle A of the cords 6a, 6b of the various reinforcing layers 5 is from 15° to 45° both inclusive. In this state, the air injection device 12 remains inactive.

Ordinarily, the fender 1 is used in this neutral state, and contacts a vessel 15 moored to the quay 16. If, for example, a tsunami causes the vessel 15 moored to the quay 16 to suddenly rock and excessively compress the fender 1, the internal pressure of the fender 1 will abnormally increase. In such an event, the air injection device 12 is configured to be activated when the pressure sensor 13 detects an internal pressure exceeding a reference pressure level. The reference pressure level is a pressure level set a predetermined level higher than the specified pressure in the neutral state such that the fender 1 will not burst.

Figure 5:
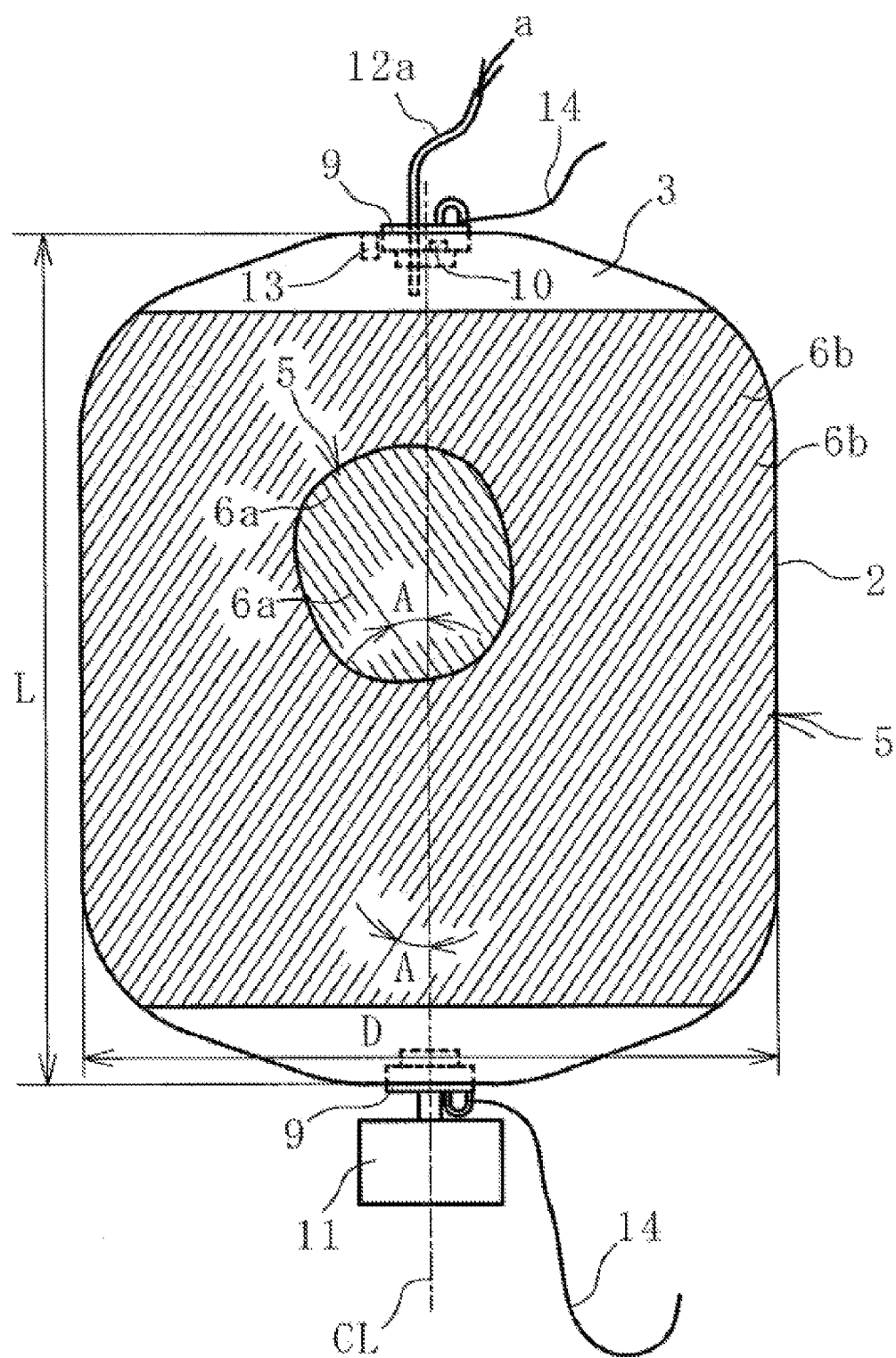
FIG. 5 is a partially cut-out explanatory drawing illustrating the state of reinforcing layers when a body portion has expanded in diameter.

When the air injection device 12 is activated, additional air a is immediately injected into the internal space of the fender 1. The injection of the additional air a causes the cord angle A of the cords 6a, 6b of the various reinforcing layers 5 to increase to roughly a stable angle of repose (from 54° to 55° both inclusive). During this process, the presence of the intermediate rubber layers 8 causes the various intermediate rubber layers 8 to exhibit a suitable level of shear deformation. As a result, the cord angle A smoothly varies up to roughly the angle of repose, as illustrated in FIG. 5, thereby allowing the body portion 2 to rapidly increase greatly in diameter and inflate.

The internal pressure of the fender 1 when, for example, additional air a has been injected until the body portion 2 is in a state of maximum expansion and inflation is, for example, about 150 kPa.

A cord angle A in the neutral state of less than 15° is undesirable, as excessive amounts of shear stress will be generated in the intermediate rubber layers 8 in order to increase the cord angle A to roughly the angle of repose. Conversely, a cord angle A exceeding 45° will decrease the extent to which the body portion 2 increases in diameter from the neutral state when additional air a is injected. For these reasons, the cord angle A in the neutral state is set to from 15° to 45° both inclusive.

When the fender 1 is excessively compressed as described above, the body portion 2 expands in diameter, rapidly increasing the cubic capacity of the internal space and increasing the tolerate level of compression. This causes a rapid and dramatic increase in the energy-absorbing capability of the fender 1. In addition, internal pressure is increased by the injection of the additional air a into the internal space, which also increases the energy-absorbing capability of the fender 1. The fender 1 is thus capable of sufficiently responding to sudden increases in berthing impact energy caused by sudden rocking of a moored vessel 15 without bursting.

If the internal pressure of the fender 1 increases even further and exceeds the maximum internal pressure, the safety valve 10 opens, thereby venting air a within the internal space to the exterior and reducing internal pressure. If air a is continuously vented to the exterior until the internal pressure of the fender 1 falls to or below a minimum internal pressure, the pressure sensor 13 detects this situation and activates the air injection device 12, causing additional air a to be injected into the internal space until specified internal pressure is reached.

Using an air injection cylinder operated by a built-in power source or a non-electrically operated air injection cylinder (i.e., one in which the valve opens mechanically) as the air injection device 12 allows additional air a to be injected into the internal space of the fender 1 without the need for an external power source. This reliably allows for a dramatic increase in the energy absorption of the fender 1 even during emergency situations such as power outages.

Mooring the upper and lower ends of the fender 1 to the quay 16 via guy chains 14 as in the present embodiment keeps the fender 1 from being unintentionally swept away.

If the thickness of the intermediate rubber layers 8 is less than 1 mm, it will be difficult to obtain sufficient shear deformation when expanding the body portion 2; if the thickness exceeds 5 mm, the weight of the fender 1 will be excessive. For these reasons, the thickness of the intermediate rubber layers 8 is preferably from 1 mm to 5 mm both inclusive.

The 100% modulus of the rubber forming the intermediate rubber layers 8 is more preferably from 0.5 MPa to 5.0 MPa both inclusive. If the 100% modulus of the rubber forming the intermediate rubber layers 8 is less than 0.5 MPa, the body portion 2 will take time to contract and reduce in diameter, and may not return to its original diameter. Conversely, if the 100% modulus exceeds 5.0 MPa, the shear force of the intermediate rubber layers 8 during expansion will increase, impeding deformation and making it difficult for the body portion 2 to sufficiently increase in diameter.

In the present embodiment, all of the intermediate rubber layers 8 have identical thicknesses when in the neutral state; however, an arrangement in which the thickness of the intermediate rubber layers 8 increases the closer the intermediate rubber layers 8 are to the outer circumferential side of the fender is also possible. When the body portion 2 increases in diameter, higher levels of shear deformation may be necessary the closer the intermediate rubber layers 8 are to the exterior; thus, such an arrangement is advantageous in keeping excessive loads from being placed on some of the intermediate rubber layers 8 when the body portion 2 expands.

What is claimed is:

1. A vertical pneumatic fender comprising a cylindrical body portion; and hemispherical portions at both ends of the cylindrical body portion, the body portion being constituted by a plurality of reinforcing layers layered between an inner rubber layer and an outer rubber layer, the reinforcing layers being cord layers formed from a multiplicity of cords arranged in parallel to one another, cords in adjacently layered upper and lower reinforcing layers being disposed so as to intersect one another at a predetermined cord angle with respect to a cylinder axial direction, a bob being connected to the lower hemispherical portion, and ballast water being contained within an internal space of the fender, wherein the fender is characterized in that:

intermediate rubber layers are interposed between the reinforcing layers, the cord angle is set to from 15° to 45° both inclusive in a neutral state, and an air injection device for injecting air is connected to the internal space.

2. The vertical pneumatic fender according to claim 1, wherein the intermediate rubber layers have thicknesses of from 1 mm to 5 mm both inclusive in a neutral state.

3. The vertical pneumatic fender according to claim 1, wherein the rubber making up the intermediate rubber layer has a 100% modulus of from 0.5 MPa to 5.0 MPa both inclusive.

4. The vertical pneumatic fender according to claim 1, wherein the intermediate rubber layers increase in neutral-state thickness the closer the intermediate rubber layers are to an outer circumferential side of the fender.

5. The vertical pneumatic fender according to claim 2, wherein the rubber making up the intermediate rubber layer has a 100% modulus of from 0.5 MPa to 5.0 MPa both inclusive.

6. The vertical pneumatic fender according to claim 5, wherein the intermediate rubber layers increase in neutral-state thickness the closer the intermediate rubber layers are to an outer circumferential side of the fender.

7. The vertical pneumatic fender according to claim 2, wherein the intermediate rubber layers increase in neutral-state thickness the closer the intermediate rubber layers are to an outer circumferential side of the fender.

8. The vertical pneumatic fender according to claim 3, wherein the intermediate rubber layers increase in neutral-state thickness the closer the intermediate rubber layers are to an outer circumferential side of the fender.

* * * * *